(12) United States Patent
Laroia et al.

(10) Patent No.: US 7,397,838 B2
(45) Date of Patent: *Jul. 8, 2008

(54) BASE STATION IDENTIFICATION IN ORTHOGONAL FREQUENCY DIVISION MULTIPLEXING BASED SPREAD SPECTRUM MULTIPLE ACCESS SYSTEMS

(75) Inventors: Rajiv Laroia, Basking Ridge, NJ (US); Junyi Li, Matawan, NJ (US); Sundeep Rangan, Hoboken, NJ (US); Pramod Viswanath, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 11/168,210

(22) Filed: Jun. 27, 2005

(65) Prior Publication Data

US 2005/0238083 A1   Oct. 27, 2005

Related U.S. Application Data

(63) Continuation of application No. 09/551,078, filed on Apr. 18, 2000, now Pat. No. 6,961,364.

(51) Int. Cl.
*H04B 1/713* (2006.01)
(52) U.S. Cl. ..................................... 375/132
(58) Field of Classification Search ................. 375/130, 375/132–133, 136–138, 260
See application file for complete search history.

(56) References Cited

U.S. PATENT DOCUMENTS 5,867,478 A    2/1999   Baum et al.

6,018,317 A    1/2000   Dogan et al.

(Continued)

FOREIGN PATENT DOCUMENTS

CA        2298360        9/2000

(Continued)

OTHER PUBLICATIONS

F. Tufvesson et al., "Pilot Assisted Estimation for OFDM in Mobile Cellular Systems", *IEEE*, 0-7803-3659-Mar. 1997, pp. 1639-1643.

(Continued)

*Primary Examiner*—Kevin Burd
(74) *Attorney, Agent, or Firm*—David J. Huffaker; Ross L. Franks; Thoms Rouse

(57) ABSTRACT

A base station having the strongest downlink signal is identified by utilizing a unique slope of a pilot tone hopping sequence being transmitted by a base station. Specifically, base station identification is realized by determining the slope of the strongest received pilot signal, i.e., the received pilot signal having the maximum energy. In an embodiment of the invention, the pilot tone hopping sequence is based on a Latin Squares sequence. With a Latin Squares based pilot tone hopping sequence, all a mobile user unit needs is to locate the frequency of the pilot tones at one time because the pilot tone locations at subsequent times can be determined from the slope of the Latin Squares pilot tone hopping sequence. The slope and initial frequency shift of the pilot tone hopping sequence with the strongest received power is determined by employing a unique maximum energy detector.

10 Claims, 4 Drawing Sheets

U.S. PATENT DOCUMENTS

| | | | |
|---|---|---|---|
| 6,131,016 | A | 10/2000 | Greenstein et al. |
| 6,282,185 | B1 | 8/2001 | Hakkinen et al. |
| 6,473,418 | B1 | 10/2002 | Laroia et al. |
| 6,961,364 | B1 * | 11/2005 | Laroia et al. ............ 375/132 |
| 2001/0043578 | A1 | 11/2001 | Kumar et al. |

FOREIGN PATENT DOCUMENTS

| | | |
|---|---|---|
| WO | WO 97/26742 | 7/1997 |

OTHER PUBLICATIONS

R. Negi et al., "Pilot Tone Selection for Channel Estimation in a Mobile OFDM System", *IEEE Transactions on Consumer Electronics*, pp. 1122-1128, 1998.

EPC Search Report for European Application No. 01303316, Apr. 9, 2001.

J. Fernandez-Getino Garcia et al: "Efficient Pilot Patterns for Channel Estimation in OFDM Systems Over HF Channels", VTC 1999-Fall, IEEE VTS 50$^{st}$, Vehicular Technology Conference, Gateway to the 21$^{th}$, Century Communications Village, Amsterdam, Sep. 19-22, 1999, IEEE Vehicular Technology Conference, New York, NY, U.S. A., vol. 4, Conf 50 , Sep. 19, 1999, pp. 2193-2197.

C.C. Wang et al: "Dynamic Channel Resource Allocation in Frequency Hopped Wireless Communication Systems", Information Theory, 1994. Proceedings, 1994 IEEE International Symposium on Trondheim, Norway 27, June 1, Jul. 1994, New York, NY, U.S.A., IEEE, Jun. 27, 1994, p. 229.

D. S. Han et al: "On the Synchronization of MC-CDMA System for Indoor Wireless Communications", VTC 1999-Fall, IEEE VTS 50$^{th}$, Vehicular Technology Conference; Gateway to the 21$^{st}$ Century Communications Village, Amsterdam, Sep. 19-22, 1999, IEEE Vehicular Technology Conferenc, New York, NY, U.S. A, vol. 2, Conf. 50, Sep. 1999, pp. 693-697.

K. Fazel et al: "A Flexible and High Performance Cellular Mobile Communications System Based on Orthogonal Multi-Carrier SSMA", Wireless Personal Communications, Kluwer Academic Publishers, NL, vol. 2, No. ½, 1995, pp. 121-144.

* cited by examiner

BASE STATION IDENTIFICATION IN ORTHOGONAL FREQUENCY DIVISION MULTIPLEXING BASED SPREAD SPECTRUM MULTIPLE ACCESS SYSTEMS

This application is related to U.S. patent application Ser. No. 09/551,791 which was filed on Apr. 18, 2000, and the present application is a continuation of pending U.S. patent application Ser. No. 09/551,078, filed on Apr. 18, 2000 now U.S. Pat. No. 6,961,364 and titled "BASE STATION IDENTIFICATION IN ORTHOGONAL FREQUENCY DIVISION MULTIPLEXING BASED SPREAD SPECTRUM MULTIPLE ACCESS SYSTEMS" which is hereby expressly incorporated by reference.

TECHNICAL FIELD

This invention relates to wireless communications systems and, more particularly, to orthogonal frequency division multiplexing (OFDM) based spread spectrum multiple access (SSMA) systems.

BACKGROUND OF THE INVENTION

It is important that wireless communications systems be such as to maximize the number of users that can be adequately served and to maximize data transmission rates, if data services are provided. Wireless communications systems are typically shared media systems, i.e., there is a fixed available bandwidth that is shared by all users of the wireless system. Such wireless communications systems are often implemented as so-called "cellular" communications systems, in which the territory being covered is divided into separate cells, and each cell is served by a base station.

In such systems, it is important that mobile user units are rapidly able to identify and synchronize to the downlink of a base station transmitting the strongest signal. Prior arrangements have transmitted training symbols periodically for mobile user units to detect and synchronize to the associated base station downlink. In such arrangements, there is a large probability that delays occur in identifying the base station transmitting the strongest signal because the training symbols are typically transmitted at the beginning of a frame. It is also likely that the training symbols transmitted from different base stations would interfere with each other. Indeed, it is known that once the training symbols interfere with each other they will continue to interfere. Thus, if the training symbols are corrupted, then the data is also corrupted, thereby causing loss in efficiency.

SUMMARY OF THE INVENTION

Problems and/or limitations related to prior mobile user units that have attempted to identify a base station having the strongest downlink signal are addressed by utilizing a pilot tone hopping sequence being transmitted by a base station. Specifically, base station identification is realized by determining the slope of the strongest received pilot signal, i.e., the received pilot signal having the maximum energy.

In an embodiment of the invention, the pilot tone hopping sequence is based on a Latin Squares sequence. With a Latin Squares based pilot tone hopping sequence, all a mobile user unit needs is to locate the frequency of the pilot tones at one time because the pilot tone locations at subsequent times can be determined from the unique slope of the Latin Squares pilot tone hopping sequence. The slope and initial frequency shift of the pilot tone hopping sequence with the strongest received power is determined by employing a unique maximum energy detector. This unique slope of the pilot tone hopping sequence is then advantageously employed to identify the base station having the strongest downlink signal.

In one embodiment, the slope and initial frequency shift of the pilot signal having the strongest received power is determined by finding the slope and initial frequency shift of a predicted set of pilot tone locations having the maximum received energy.

In another embodiment, the frequency offset of the pilot signal with the strongest, i.e., maximum, received power is estimated at each of times "t". These frequency offsets are employed in accordance with a prescribed relationship to determine the unknown slope and the initial frequency shift of the pilot signal.

A technical advantage to using the pilot tone hopping sequence to identify the base station having the strongest downlink signal is that the inherent latency resulting from using a sequence of training symbols is not present.

DETAILED DESCRIPTION

Figure 1:
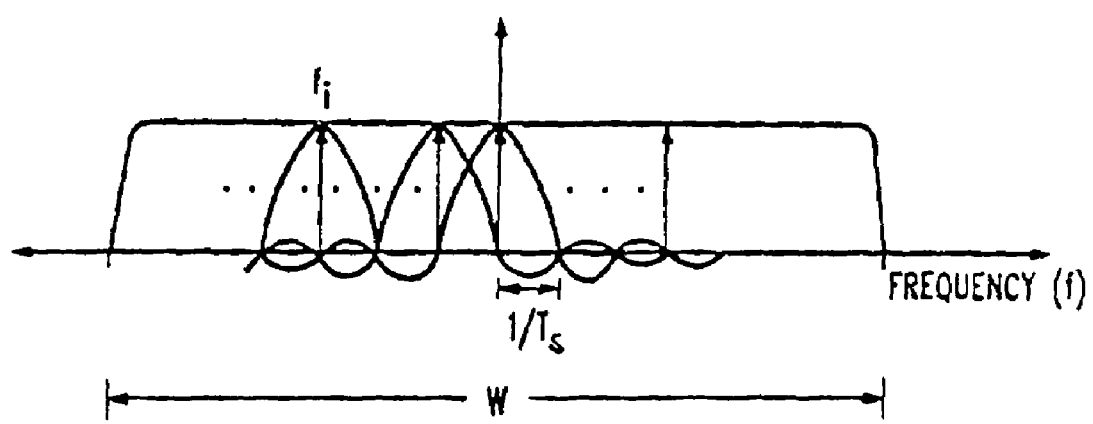
FIG. 1 illustrates a frequency domain representation in which a prescribed plurality of tones is generated in a prescribed bandwidth.

FIG. 1 illustrates a frequency domain representation in which a prescribed plurality of tones is generated in a prescribed bandwidth. In this example, bandwidth W is employed to generate a total of N tones, i.e., i=1, ..., N. The tones are spaced at $\Delta f=1/T_s$ apart, where $T_s$ is the duration of an OFDM symbol. Note that the tones employed in this embodiment of the invention are generated differently than those generated for a narrow band system. Specifically, in a narrow band system the energy from each tone is strictly confined to a narrow bandwidth centered around the tone frequency, whereas in an Orthogonal Frequency Division Multiplexing (OFDM) system that is a wide band system the energy at a particular tone is allowed to leak into the entire bandwidth W, but it is so arranged that the tones do not interfere with one another.

Figure 2:
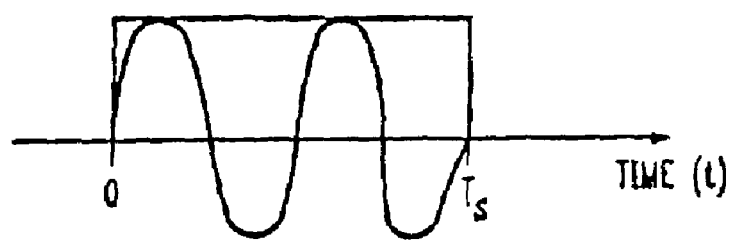
FIG. 2 illustrates a time domain representation of a tone $f_i$.

FIG. 2 illustrates a time domain representation of tone $f_i$ within symbol interval $T_s$. Again, note that within each symbol interval $T_s$, data may be transmitted on each of the tones substantially simultaneously.

Figure 3:
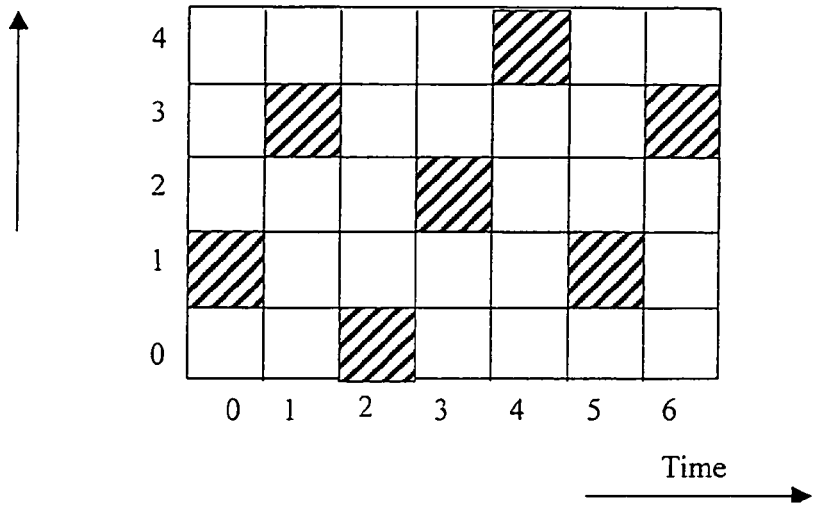
FIG. 3 is a graphical representation of a time-frequency grid including a pilot tone hopping sequence.

FIG. 3 is a graphical representation of an example OFDM channel from a base station to a number of mobile user units, i.e., receivers. The OFDM channel is represented as a time-frequency grid, i.e., plane. Each column of the grid represents the time interval for one OFDM symbol interval, and each OFDM symbol is comprised of a number of tones. In this example, there are N=5 tones in each symbol interval. The tones are numbered along the frequency axis and the symbol intervals, i.e., periods, are numbered along the time axis. If the spacing between tones in FIG. 3 is $\Delta f$, then:

tone 0 corresponds to $f$;
tone 1 corresponds to $f+\Delta f$;
tone 2 corresponds to $f+2\Delta f$;
tone 3 corresponds to $f+3\Delta f$;
tone 4 corresponds to $f+4\Delta f$.

Similarly, if the duration of a symbol interval is $T_s$ then:

time 0 corresponds to $t_0$;
time 1 corresponds to $t_0+T$
time 2 corresponds to $t_0+2T_s$;
time 3 corresponds to $t_0+3\ T_s$;
time 4 corresponds to $t_0+4T_s$;
time 5 corresponds to $t_0+5\ T_s$;
time 6 corresponds to $t_0+6T_s$.

In general, a pilot signal includes known waveforms that are transmitted from a base station so that mobile user units, i.e., receivers, can identify the base station and estimate various channel parameters. In an Orthogonal Frequency Division Multiplexing based Spread Spectrum Multiple Access (OFDM-SSMA) system, in accordance with an aspect of the invention, the pilot signal is comprised of known symbols transmitted on prescribed tones during prescribed symbol intervals. In a given symbol interval, the tones used for the pilot signal are called the "pilot tones", and the assignment of pilot tones as a function of time is called the "pilot hopping sequence". Again, it is noted that the inherent delays resulting when using the training sequence of symbols is not experienced when using the pilot tone hopping sequence to identify the base station having the strongest downlink signal.

Since the OFDM-SSMA physical layer is based on the pilot signals, symbols on the pilot tones are transmitted at higher power than symbols on non-pilot tones. Pilot tones are also boosted in power so that they may be received throughout the cell. Therefore, for the purpose of identification, pilot signals can be distinguished by the fact that the energy received on the pilot tones is higher than the energy on the non-pilot tones.

In FIG. 3, an example set of pilot tones is indicated by the hatched squares in the time-frequency grid. In this example, the base station transmits one pilot tone in each OFDM symbol interval. During: symbol interval (0), tone (1) is used as a pilot tone; symbol interval (1), tone (4) is used as a pilot tone; symbol interval (2), tone (0) is used as a pilot tone; symbol interval (3), tone (2) is used as a pilot tone; symbol interval (4), tone (4) is used as a pilot tone; symbol interval (5), tone (1) is used as a pilot tone; etc. . . .

Figure 4:
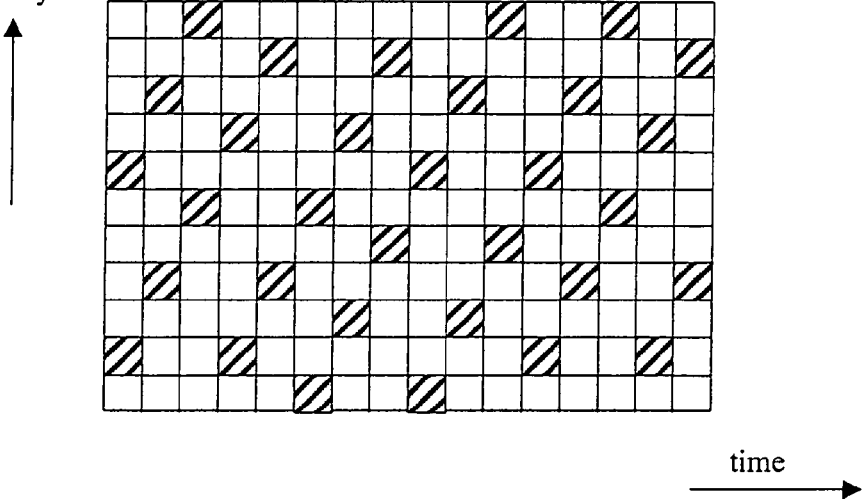
FIG. 4 is a graphical representation of a Latin Squares hopping sequence.

FIG. 4 shows an example of a Latin Squares pilot hopping sequence. The pilot signal corresponding to a Latin Squares pilot hopping sequence will be called a "Latin Squares pilot signal", or simply "Latin Squares pilot". In a Latin Squares pilot hopping sequence, the number of tones, N, is a prime number, and the pilot signals are transmitted on a fixed number, $N_p$, of the N tones in each OFDM symbol interval. The tone number of the j-th pilot tone in the t-th symbol interval is given by, $$\sigma_s(j,t)=st+n_j (\text{mod } N), j=1,\ldots,N_p, \quad (1)$$

where s and $n_j$ are integers. A Latin Squares pilot signal of the form of Equation (1) can be viewed as a set of $N_p$ parallel, cyclically rotating lines in a prescribed time-frequency grid, i.e., plane. The parameter, s, is the slope of the lines and the parameters, $n_j$, are the frequency offsets. In the example Latin Squares pilot hopping in FIG. 4, N=11, $N_p$=2, $n_1$=1, $n_2$=5 and s=2.

The frequency offsets and slope are design parameters of the Latin Squares pilot signal. For the purpose of channel estimation, the frequency offsets and slope should be selected so that the pilot tones are close to uniformly distributed in the time-frequency plane. A uniform distribution minimizes the worst-case interpolation error in the channel estimation. Specific values for the frequency offsets and slopes can be tested by numerical simulation with a specific channel estimator and channel conditions.

Figure 5:
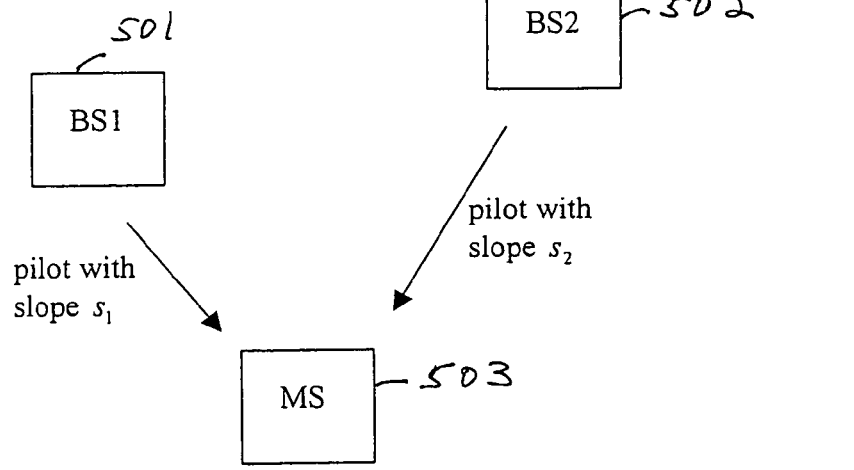
FIG. 5 shows, in simplified block form, an OFDM-SSMA cellular system with Latin Squares pilots.
Figure 6:
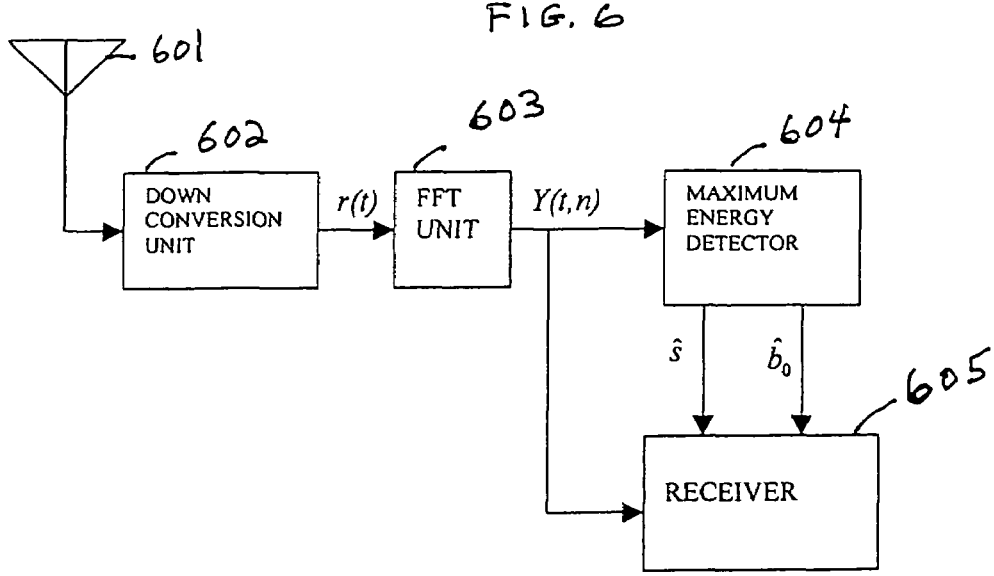
FIG. 6 shows, in simplified block diagram form, details of a mobile user unit in which an embodiment of the invention may advantageously be employed.

FIG. 5 depicts an OFDM-SSMA cellular system using Latin Squares pilots. The figure shows two base stations 501 and 502 in the cellular system, denoted BS1 and BS2, respectively. Each base station 501, 502 in the cellular system transmits a Latin Squares pilot. A mobile user unit 503, denoted MS, receives pilots signals and other transmissions from one or more base stations in the cellular system. The Latin Squares pilots transmitted by all the base stations 501, 502 use the same total number of tones, N number of pilot tones per OFDM symbol, $N_p$, and the frequency offsets, $n_j$. However, the slope, s, of each pilot signal is locally unique in the sense that no two neighboring base stations use the same slope. Each slope, s, is taken from some set $S \subset \{0,1,\ldots,N-1\}$. The use of locally unique slopes minimizes collisions between pilot signals from neighboring base stations. In addition, the slope provides a unique identifier for each base station. In FIG. 6, the slope of the pilot signal from BS1 (501) is denoted $s_1$, and the slope of the pilot signal from BS2 (502) is denoted $s_2$.

The base station identification problem is for the mobile user unit 503 to estimate the slope, $s \in S$, of the strongest received pilot signal. To perform this identification, the mobile user unit 503 can be pre-programmed with the common pilot signal parameters, N, $N_p$ and $n_j$, as well as the set of possible slopes, S.

In general, base station identification is conducted prior to downlink and carrier synchronization. Consequently, a mobile user unit 503 may receive the pilot signals with unknown frequency and timing errors, and mobile user units must be able to perform base station identification in the presence of these errors. Also, after identifying the pilot hopping sequence of the strongest base station, the mobile user unit must synchronize its timing and carrier so that the location of subsequent pilot tones can be determined.

To define this synchronization problem more precisely, let $\Delta t$ denote the timing error between a base station and mobile user unit in number of OFDM symbol intervals, and $\Delta n$ denote the frequency error in number of tones. For the time being, it is assumed that $\Delta t$ and $\Delta n$ are both integer errors. Fractional errors will be considered later. Under integer time and frequency errors, $\Delta t$ and $\Delta n$, if a base station transmits a pilot sequence given by Equation (1), the j-th pilot tone in the t-th symbol interval of the mobile will appear on tone number, $$\sigma_s(j,t+\Delta t)+\Delta n=b(t)+n_j, \quad (2)$$

where, $$b(t)=s(t+\Delta t)+\Delta n, \quad (3)$$

and where b(t) is the pilot frequency shift at time t. Equation (2) shows that if the frequency shift b(t) is known, the locations of the pilot tones at t are known. Also, if the frequency shift is determined at any one time, say b(0), the frequency shift at other times can be determined from b(t)=b(0)+st. Therefore, for synchronization, it suffices to estimate the frequency shift at any one time. The value b(0) will be called the initial frequency shift.

The fact that synchronization requires only the estimation of the initial frequency shift is a particular and useful feature of the Latin Square pilot hopping sequences. In general, synchronization involves estimation of time and frequency errors, and therefore demands a two parameter search. Synchronization for the Latin Squares sequences considered here, however, only requires the estimation of one parameter.

In summary, in an OFDM-SSMA cellular system, each base station transmits a Latin Squares pilot signal with a locally unique slope. A mobile user unit performs base station identification by estimating the slope of the strongest received pilot signal. In addition, the mobile user unit can synchronize to the pilot signal by estimating its initial frequency shift.

FIG. 6 shows, in simplified block diagram form, the details of a mobile user unit 600 containing the proposed maximum energy detector for base station identification. An incoming signal is supplied via an antenna 601 to a down conversion unit 602. The incoming signal includes pilot signals from one or more base stations. Down conversion unit 602 yields the baseband signal r(t) from the signal received by the mobile user unit 600. The received signal r(t) is supplied to fast Fourier transform (FFT) unit 603 that during each OFDM symbol interval performs an FFT on it to yield Y(t,n). In this example, Y(t,n) denotes the complex value received on the n-th tone in the t-th symbol interval and is supplied to maximum energy detector 604 and to receiver 605. Maximum energy detector 604 uses FFT data Y(t, n) from $N_{sy}$ consecutive OFDM symbols to estimate the slope and initial frequency shift of the pilot signal with the maximum received strength. As indicated above, the FFT symbols to be used for the base station identification are denoted Y(t,n), t=0, . . . , $N_{sy}$−1 and n=0, . . . ,N−1, and the estimates of the slope and initial frequency shift of the strongest received pilot signal are denoted $\hat{s}$ and $\hat{b}_0$, respectively. The pilot slope $\hat{s}$ and initial frequency shift $\hat{b}_0$ estimates are supplied to a receiver 605 and employed to synchronize receiver 605 to the incoming carrier and to locate subsequent symbols in the pilot signal.

Figure 7:
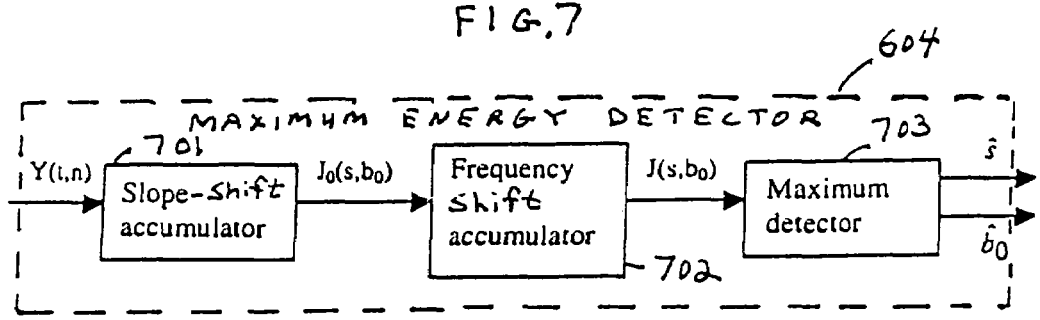
FIG. 7 shows, in simplified block diagram for, details of an embodiment of a maximum energy detector that may be employed in the mobile user unit of FIG. 6.

FIG. 7 shows, in simplified block diagram form details of an embodiment of a maximum energy detector 604 that may be employed in the mobile user unit 600 of FIG. 6. It has been seen that for the Latin Squares pilot tones, each candidate slope, s, and initial frequency shift, $b_0$=b(0), corresponds to a set of predicted pilot tone locations, (t,n), with $$n = st + b_0 + n_j, j=1, \ldots, N_p, t=0, \ldots, N_{sy}-1. \quad (4)$$

Symbols on these pilot tones should be received with greater power than the symbols on the non-pilot tones. That is, the energy, $|Y(t, n)|^2$, should on average be highest on the pilot tones of the pilot signal with the strongest received signal strength. Therefore, a natural way to estimate the slope and frequency shift of the strongest pilot signal is to find the slope and frequency shift for which there is a maximum received energy on the predicted set of pilot tone locations of Equation (4). The input to the maximum energy detector 604 of FIG. 6 is the FFT data, Y(t,n), t=0, . . . , $N_{sy}$−1 and n=0, . . . ,N−1. The slope-shift accumulator 701, accumulates the energy along each possible slope, s, and initial frequency shift, $b_0$. The accumulated energy is given by the signal:

$$J_0(s, b_0) = \sum_{t=0}^{N_{sy}-1} |Y(t, st + b_0 \,(\mathrm{mod}\, N))|^2. \quad (5)$$

Then, frequency shift accumulator 702 accumulates the energy along the pilot frequency shifts, namely:

$$J(s, b_0) = \sum_{j=1}^{N_p} J_0(s, b_0 + n_j). \quad (6)$$

Maximum detector 703 estimates the slope and frequency shift of the maximum energy pilot signal as the slope and frequency shifts corresponding to the maximum accumulated pilot energy, that is:

$$\hat{s}, \hat{b}_0 = \arg\max_{s, b_0} J(s, b_0), \quad (7)$$

where the maximum is taken over s∈S and $b_0$=0, . . . , N−1.

Unfortunately, in certain applications, the above computations of Equations (5), (6) and (7) may be difficult to perform in a reasonable amount of time with the processing power available at the mobile user unit 600. To see this, note that to compute $J_0(s, b_0)$ in Equation (5) at a single point (s, $b_0$) requires $N_{sy}$ additions. Therefore, to compute $J_0(s, b_0)$ at all (s, $b_0$) requires $NN_{sl}N_{sy}$ additions, where $N_{sl}$ is the number of slopes in the slope set S. Similarly, computing J(s, $b_0$) in Equation (6) requires $NN_{sl}N_p$ additions. Therefore, the complete energy detector would require $O(NN_{sl}(N_p+N_{sy}))$ basic operations to perform. Therefore, for typical values such as N=400, $N_{sl}$=200, $N_p$=10 and $N_{sy}$=20, the full energy detector would require 2.4 million operations. This computation may be difficult for the mobile user unit 600 to perform in a suitable amount of time.

Figure 8:
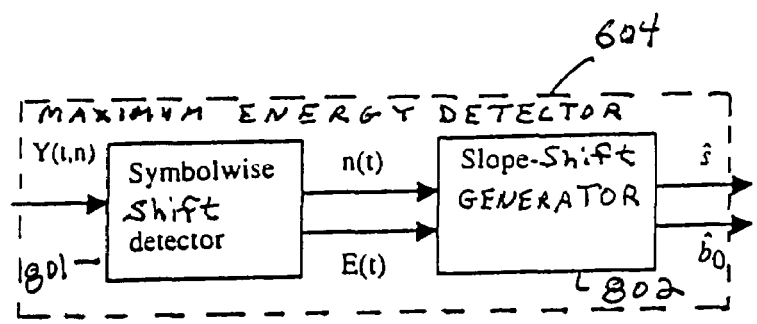
FIG. 8 shows, in simplified block diagram form, details of another embodiment of a maximum energy detector that may be employed in the mobile user unit of FIG. 6.

FIG. 8 shows, in simplified block diagram form details of another embodiment of a maximum energy detector that may be employed in the mobile user unit of FIG. 6. Symbolwise shift detector 801 estimates, at each time t, the frequency shift of the pilot signal with strongest received strength. Specifically, the block computes:

$$[E(t), n(t)] = \max_{n} \sum_{j=1}^{N_p} |Y(t, n + n_j \,(\mathrm{mod}\, N))|^2, \quad (8)$$

where E(t) is the maximum energy value and n(t) is the argument of the maximum. To understand the purpose of the computation in Equation (8), suppose that the tones of the strongest energy pilot signal appear at the locations, (t,n), given in Equation (4). Since the received energy $|Y(t, n)|^2$, will usually be maximum at these pilot tone locations, the maximization in Equation (9) will typically result in:

$$n(t) = st + b_0 (\mathrm{mod}\, N), \quad (9)$$

and E(t) will typically be the pilot signal energy at the time t. The value n(t) in Equation (9) is precisely the frequency shift estimate of the pilot signal at time t. Note that n(t) is sometimes referred to as the symbolwise frequency shift estimate.

Slope-shift solver 802 uses the relation in Equation (9) and the frequency offset estimates, n(t), to determine the unknown slope, s, and initial frequency shift, $b_0$. Since, the pilot signals are only on average higher in power than the non-pilot tones, the relation of Equation (9) may not hold at all time points t. Therefore, the slope-shift solver 802 must be robust against some of the data points n(t) not satisfying Equation (9). For robustness, the value E(t) can be used as measure of the reliability of the data n(t). Larger values of E(t) imply a larger amount of energy captured at the frequency shift estimate, n(t), and such values of n(t) can therefore be considered more reliable.

One possible way of implementing a robust slope-shift solver 802 is referred to as the difference method. This method uses the fact that if n(t) and n(t−1) both satisfy Equation (10), then n(t)−n(t−1)=s. Therefore, the slope, s, can be estimated by:

$$\hat{s} = \arg\max_{s \in S} \sum_{t=1}^{N_{sy}-1} E(t) 1_{\{n(t)-n(t-1)=s\}} \quad (10)$$

where 1 is the indicator function. The estimator as defined by Equation (10) finds the slope, s, on which the total received pilot energy, E(t), at the points, t, satisfying n(t)−n(t−1)=s is maximized. After estimating the slope, the initial frequency shift can be estimated by:

$$\hat{b}_0 = \arg\max_{b_0=0,\ldots,N-1} \sum_{t=0}^{N_{sy}-1} E(t) 1_{\{n(t)=st+b_0\}}. \quad (11)$$

The difference method is the process given by Equations (10) and (11).

Figure 9:
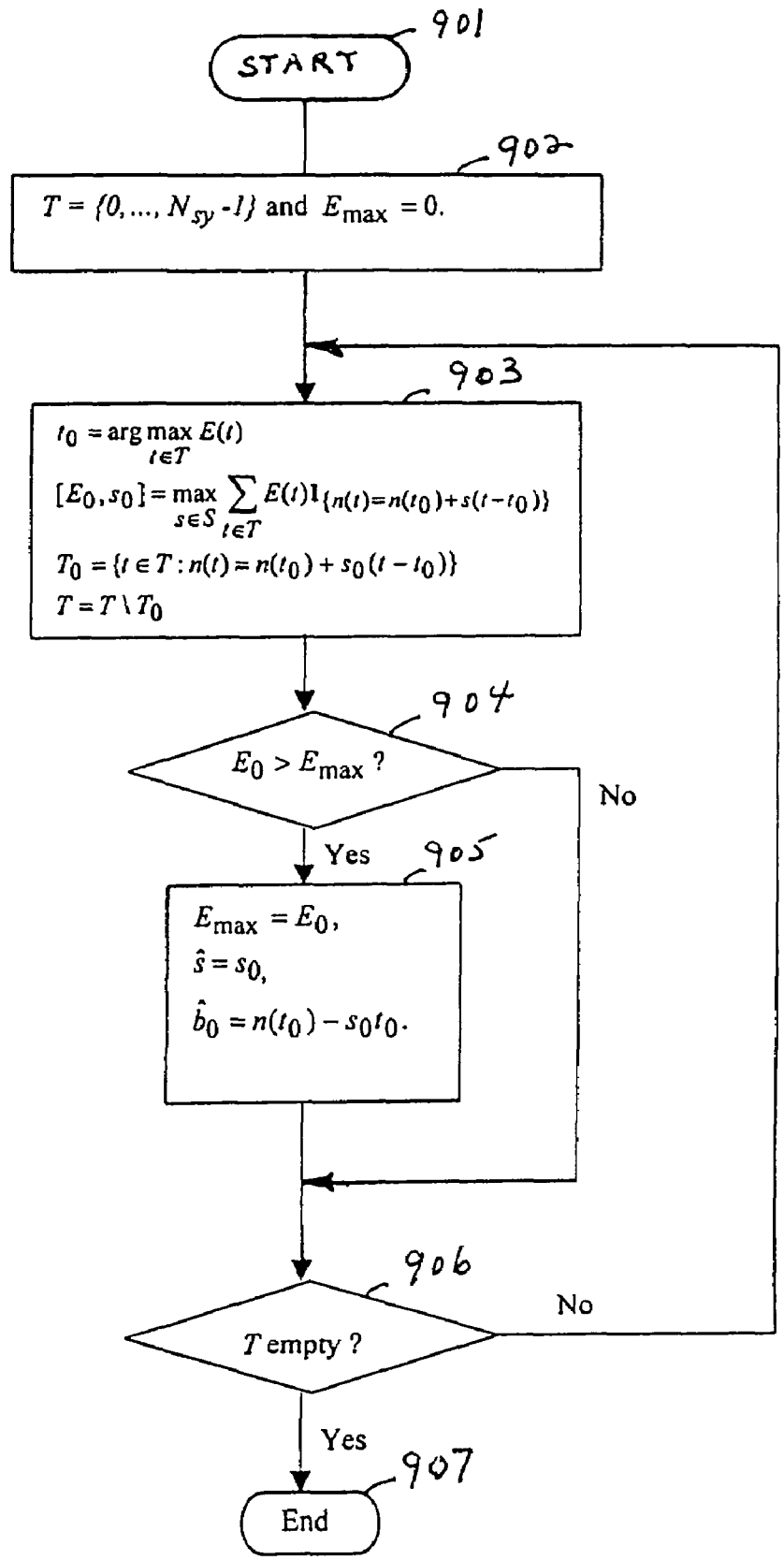
FIG. 9 is a flow chart illustrating steps in a process that may be employed in the slope-shift solver of FIG. 8.

A second possible method for the slope-shift solver 802 is referred to as the iterative test method. FIG. 9 is a flow chart illustrating the steps for the iterative test solver Step 901: Start process.
Step 902: Initialize T={0, . . . , $N_{sy}$−1}, and $E_{max}$=0.
Step 903: Compute $$t_0 = \arg\max_{t \in T} E(t) \quad (12)$$

$$[E_0, s_0] = \max_{s \in S} \sum_{t \in T} E(t) 1_{\{n(t)=n(t_0)+s(t-t_0)\}}$$

$$T_0 = \{t \in T : n(t) = n(t_0) + s_0(t-t_0)\}$$

$$T = T \setminus T_0$$

where $E_0$ is the value of the maximum, i.e., strongest value, and $s_0$ is the argument of the maximum.
Step 904: If $E_0 > E_{max}$, go to step 905.
Step 905: Set $$E_{max}=E_0, \hat{s}=s_0, \hat{b}_0=n(t_0)-s_0 t_0. \quad (13)$$

Then, go to step 906.
Step 904: If not go to step 906.
Step 906: If T is non-empty return to step 903, otherwise END via step 907.

The values $\hat{s}$ and $\hat{b}_0$ in Step 905 are the final estimates for the slope and initial frequency shift of the strongest pilot signal.

The logic in the iterative test method is as follows. The set T is a set of times and is initialized in Step 902 to all the $N_{sy}$ time points. Step 903 then finds the time, $t_0 \in T$, and slope, $s_0 \in S$, such that the set of times t on the line n(t)=n($t_0$)+$s_0$(t−$t_0$), has the largest total pilot signal energy. The points on this line are then removed from T. In Step 904, if the total energy on the candidate line is larger than any previous candidate line, the slope and frequency shift estimates are updated to the slope and frequency shifts of the candidate line in step 905. Steps 903 through 906 are repeated until all points have been used in a candidate line.

Both the difference method and iterative test method demand significantly less computational resources than the full maximum energy detector. In both methods, the bulk of the computation is in the initial symbolwise shift detection in Equation (8). It can be verified that to conduct this maximization at all the $N_{sy}$ time points $N_{sy}NN_p$ operations. Therefore, for the values N=400, $N_p$=10 and $N_{sy}$=20, the simplified maximum energy detector would require 80000 operations, which is considerably less than the 2.4 million needed by the full energy detector.

The above base station identification methods can be further simplified by first quantizing the FFT data Y(t,n). For example, at each time t, we can compute a quantized value of Y(t,n) given by:

$$Y_q(t, n) = \begin{cases} 1 & \text{if } |Y(t, n)|^2 > q\mu(t) \\ 0 & \text{else} \end{cases} \quad (15)$$

where q>1 is an adjustable quantization threshold, and $\mu(t)$ is the mean received energy at time t:

$$\mu(t) = \frac{1}{N} \sum_{n=0}^{N-1} |Y(t, n)|^2. \quad (16)$$

The quantized value $Y_q$(t, n) can then be used in place of |Y(t, n)|² in the above base station identification processes. If the parameter q is set sufficiently high, $Y_q$(t, n) will be zero at most values of n, and therefore the computations such as Equation (8) will be simplified.

In the above discussion, it has been assumed that the time error between the base station and mobile is some integer number of OFDM symbol intervals, and the frequency error is some integer number of tones. However, in general both the time and frequency errors will have fractional components as well. Fractional errors result in the pilot tones being split between two time symbols and spread out in frequency. This splitting reduces the pilot power in the main time-frequency point, making the pilot more difficult to identify. Meanwhile, without proper downlink synchronization, data signals from the base station are not received orthogonally with the pilot signal, thus causing extra interference in addition to that generated by neighboring base-stations. Overall, fractional time and frequency errors can thereby significantly degrade the base station identification. In particular, the strongest energy detection process may not perform well.

To avoid this fractional problem, the above identification processes be run at several fractional offsets. Specifically, for a given received signal r(t), the mobile user unit can slide the FFT window $N_{fr,t}$ times along the time axis, each time obtaining a different set of frequency sample vectors. The step size of sliding the FFT window should be $1/N_{fr,t}$ of the symbol interval. Similarly, the mobile user unit can slide the FFT window $N_{fr,f}$ times along the frequency axis with a spacing of $1/N_{fr,f}$ of a tone. The identification process can be run on the frequency samples obtained from each of the fractional time and frequency offsets. This process yields $N_{fr,t}N_{fr,f}$ candidate slope and frequency shifts.

To determine which of the $N_{fr,t}N_{fr,f}$ candidate slope and shifts to use, the mobile user can select the slope and shift corresponding to the strongest pilot energy. For a given candidate $(s,b_0)$ the pilot energy is given by $J(s,b_0)$ in Equation (6). If the difference method is used, an approximation for the pilot energy is given by the value of the strongest attained in equation (11). The value $E_{max}$ may be employed in the iterative test method.

The above-described embodiments are, of course, merely illustrative of the principles of the invention. Indeed, numerous other methods or apparatus may be devised by those skilled in the art without departing from the spirit and scope of the invention.

What is claimed is:

1. An orthogonal frequency division multiplexing (OFDM) based spread spectrum multiple access wireless communications method comprising:

operating each of a plurality of adjacent base stations to transmit pilot tones according to one of a plurality of different pilot tone hopping sequences over at least a portion of a pilot sequence transmission time period, said portion including multiple symbol time periods, at least one of the different transmitted pilot tone hopping sequences including at least two pilot tones per symbol time period which are separated from one another by at least two tones during said portion of said pilot sequence transmission time period, said transmitting of a pilot tone hopping sequence performed by at least one of the adjacent base stations including transmitting the same number of pilot tones in each successive symbol time period in said portion of said pilot sequence transmission period but changing the frequency of the transmitted pilot tones from one symbol time period to the next symbol time period by a frequency shift corresponding to a fixed number of tones; and wherein said step of operating each of a plurality of adjacent base stations to transmit pilot tones includes controlling adjacent base stations to use different frequency shifts to generate pilot tone hopping sequences resulting in different pilot tone slopes for adjacent base stations which can be determined from the frequency shift of the transmitted pilot tones used in consecutive symbol time periods.

2. The method of claim 1, wherein said same number of pilot tones in each successive symbol time is at least two.

3. An orthogonal frequency division multiplexing (OFDM) based spread spectrum multiple access wireless communications method comprising:

operating each of a plurality of adjacent base stations to transmit pilot tones according to one of a plurality of different pilot tone hopping sequences over at least a portion of a pilot sequence transmission time period, said portion including multiple symbol time periods, at least one of the different transmitted pilot tone hopping sequences including at least two pilot tones per symbol time period which are separated from one another by at least two tones during said portion of said pilot sequence transmission time period, said transmitting of a pilot tone hopping sequence performed by at least one of the adjacent base stations including transmitting the same number of pilot tones in each successive symbol time period in said portion of said pilot sequence transmission period but changing the frequency of the transmitted pilot tones from one symbol time period to the next symbol time period by a frequency shift corresponding to a fixed number of tones;

wherein said step of operating each of a plurality of adjacent base stations to transmit pilot tones includes controlling adjacent base stations to use different frequency shifts to generate pilot tone hopping sequences resulting in different pilot tone slopes for adjacent base stations which can be determined from the frequency shift of the transmitted pilot tones used in consecutive symbol time periods; and wherein said frequency shift corresponding to a fixed number of tones is a frequency shift corresponding to two tones for one of said adjacent base stations.

4. An orthogonal frequency division multiplexing (OFDM) based spread spectrum multiple access wireless communications method comprising:

operating each of a plurality of adjacent base stations to transmit pilot tones according to one of a plurality of different pilot tone hopping sequences over at least a portion of a pilot sequence transmission time period, said portion including multiple symbol time periods, at least one of the different transmitted pilot tone hopping sequences including at least two pilot tones per symbol time period which are separated from one another by at least two tones during said portion of said pilot sequence transmission time period, said transmitting of a pilot tone hopping sequence performed by at least one of the adjacent base stations including transmitting the same number of pilot tones in each successive symbol time period in said portion of said pilot sequence transmission period but changing the frequency of the transmitted pilot tones from one symbol time period to the next symbol time period by a frequency shift corresponding to a fixed number of tones;

wherein said step of operating each of a plurality of adjacent base stations to transmit pilot tones includes controlling adjacent base stations to use different frequency shifts to generate pilot tone hopping sequences resulting in different pilot tone slopes for adjacent base stations which can be determined from the frequency shift of the transmitted pilot tones used in consecutive symbol time periods; and wherein said portion of said pilot sequence transmission period includes at least 16 consecutive symbol time periods.

5. The method of claim 1, further comprising;

operating a mobile communications device to:
receive one or more of said plurality of different pilot tone hopping sequences; and
determine the pilot tone slope of a received pilot tone hopping sequence.

6. An orthogonal frequency division multiplexing (OFDM) based spread spectrum multiple access wireless communications method comprising:

operating each of a plurality of adjacent base stations to transmit pilot tones according to one of a plurality of different pilot tone hopping sequences over at least a portion of a pilot sequence transmission time period, said portion including multiple symbol time periods, at least one of the different transmitted pilot tone hopping sequences including at least two pilot tones per symbol time period which are separated from one another by at least two tones during said portion of said pilot sequence transmission time period, said transmitting of a pilot tone hopping sequence performed by at least one of the adjacent base stations including transmitting the same number of pilot tones in each successive symbol time period in said portion of said pilot sequence transmission period but changing the frequency of the transmitted pilot tones from one symbol time period to the next symbol time period by a frequency shift corresponding to a fixed number of tones;

wherein said step of operating each of a plurality of adjacent base stations to transmit pilot tones includes controlling adjacent base stations to use different frequency shifts to generate pilot tone hopping sequences resulting in different pilot tone slopes for adjacent base stations which can be determined from the frequency shift of the transmitted pilot tones used in consecutive symbol time periods, and wherein the method further comprises:

operating a mobile communications device to:
   receive one or more of said plurality of different pilot tone hopping sequences; and
   determine the pilot tone slope of a received pilot tone hopping sequence; and wherein operating the mobile communications device to determine the pilot tone slope includes:
   accumulating energy for each of a plurality of different possible pilot tone slopes over a plurality of consecutive symbol time periods; and
   determining the pilot tone slope based on the amount of accumulated energy, the determined pilot tone slope being the slope for which the largest amount of energy is accumulated during said plurality of consecutive symbol time periods.

7. An orthogonal frequency division multiplexing (OFDM) based spread spectrum multiple access wireless communications system comprising:

a first base station including means for transmitting pilot tones from said first base station according to a first one of a plurality of different pilot tone hopping sequences over a portion of a pilot sequence transmission time period, said portion including multiple symbol time periods, said first one of the different transmitted pilot tone hopping sequences including at least two pilot tones per symbol time period which are separated from one another by at least one tone during said portion of said pilot sequence transmission time period, transmitted pilot tones including the same number of pilot tones in each successive symbol time period in said portion of said pilot sequence transmission period but with the frequency of the transmitted pilot tones being changed from one symbol time period to the next symbol time period by a first frequency shift corresponding to a fixed number of tones; and a second base station, located adjacent said first base station, said second base station including means for transmitting pilot tones from said second base station according to a second one of said plurality of different pilot tone hopping sequences over said portion of said pilot sequence transmission time period, the second one of the different transmitted pilot tone hopping sequences including at least two pilot tones per symbol time period which are separated from one another by at least one tone during said portion of said pilot sequence transmission time period, pilot tones transmitted in accordance with the second one of said plurality of different pilot tone hopping sequences including the same number of pilot tones in each successive symbol time period in said portion of said pilot sequence transmission period but with the frequency of the transmitted pilot tones being changed from one symbol time period to the next symbol time period by a second frequency shift, said second frequency shift being different from said first frequency shift thereby resulting in the second pilot tone hopping sequence having a different pilot tone slope than the pilot tone slope of the first pilot tone hoping sequence.

8. The wireless communications system of claim 7, wherein said first frequency shift is a shift by two tones.

9. An orthogonal frequency division multiplexing (OFDM) based spread spectrum multiple access wireless communications system comprising;

a first base station including a first transmitter for transmitting pilot tones from said first base station according to a first one of a plurality of different pilot tone hopping sequences over a portion of a pilot sequence transmission time period, said portion including multiple symbol time periods, said first one of the different transmitted pilot tone hopping sequences including at least two pilot tones per symbol time period which are separated from one another by at least one tone during said portion of said pilot sequence transmission time period, transmitted pilot tones including the same number of pilot tones in each successive symbol time period in said portion of said pilot sequence transmission period but with the frequency of the transmitted pilot tones being changed from one symbol time period to the next symbol time period by a first frequency shift corresponding to a fixed number of tones; and a second base station, located adjacent said first base station, said second base station including a second transmitter for transmitting pilot tones from said second base station according to a second one of said plurality of different pilot tone hopping sequences over said portion of said pilot sequence transmission time period, the second one of the different transmitted pilot tone hopping sequences including at least two pilot tones per symbol time period which are separated from one another by at least one tone during said portion of said pilot sequence transmission time period, pilot tones transmitted in accordance with the second one of said plurality of different pilot tone hopping sequences including the same number of pilot tones in each successive symbol time period in said portion of said pilot sequence transmission period but with the frequency of the transmitted pilot tones being changed from one symbol time period to the next symbol time period by a second frequency shift, said second frequency shift being different from said first frequency shift thereby resulting in the second pilot tone hopping sequence having a different pilot tone slope than the pilot tone slope of the first pilot tone hoping sequence.

10. The wireless communications system of claim 9, wherein said first frequency shift is a shift by two tones.

* * * * *

UNITED STATES PATENT AND TRADEMARK OFFICE
CERTIFICATE OF CORRECTION

PATENT NO. : 7,397,838 B2  Page 1 of 1
APPLICATION NO. : 11/168210
DATED : July 8, 2008
INVENTOR(S) : Rajiv Laroia et al.

It is certified that error appears in the above-identified patent and that said Letters Patent is hereby corrected as shown below:

On title page, item (74) Attorney, Agent, or Firm— "Thoms Rouse", should be, --Thomas R. Rouse--
Column 12, Claim 7, line 13, "hoping", should be, --hopping--
Column 12, Claim 9, line 58, "hoping", should be, --hopping--

Signed and Sealed this

Sixteenth Day of March, 2010

David J. Kappos
*Director of the United States Patent and Trademark Office*